(12) United States Patent
Zadravec et al.

(10) Patent No.: US 7,813,037 B2
(45) Date of Patent: Oct. 12, 2010

(54) DAY/NIGHT-VISION DEVICE

(75) Inventors: Dusan Zadravec, Rebstein (CH); Felix Wälti, Marbach (CH)

(73) Assignee: Vectronix AG, Heerbrugg (CH)

( * ) Notice: Subject to any disclaimer, the term of this patent is extended or adjusted under 35 U.S.C. 154(b) by 302 days.

(21) Appl. No.: 11/995,313

(22) PCT Filed: Jul. 12, 2006

(86) PCT No.: PCT/EP2006/006816

§ 371 (c)(1),
(2), (4) Date: Feb. 20, 2008

(87) PCT Pub. No.: WO2007/006563

PCT Pub. Date: Jan. 18, 2007

(65) Prior Publication Data

US 2008/0231947 A1    Sep. 25, 2008

Related U.S. Application Data

(63) Continuation of application No. 11/180,587, filed on Jul. 14, 2005, now abandoned.

(30) Foreign Application Priority Data

Jul. 14, 2005    (EP) .................................. 05106494

(51) Int. Cl.
G02B 23/00    (2006.01)

(52) U.S. Cl. ...................................... 359/353; 359/399
(58) Field of Classification Search ......... 359/350–361, 359/399–431
See application file for complete search history.

(56) References Cited

U.S. PATENT DOCUMENTS

| 4,175,825 A | 11/1979 | Koppensteiner |
| 5,157,548 A | 10/1992 | Monnier et al. |
| 5,282,082 A * | 1/1994 | Espie et al. .................. 359/353 |
| 6,169,628 B1 * | 1/2001 | Isbell et al. .................. 359/399 |
| 6,661,572 B2 * | 12/2003 | Spink et al. .................. 359/372 |
| 2001/0028450 A1 * | 10/2001 | Zadravec ................... 356/4.01 |

FOREIGN PATENT DOCUMENTS

| DE | 33 29 589 | 3/1985 |
| GB | 472 808 | 9/1937 |
| GB | 1 405 122 | 9/1975 |

\* cited by examiner

*Primary Examiner*—Thong Nguyen
(74) *Attorney, Agent, or Firm*—Workman Nydegger

(57) ABSTRACT

In a day/night-vision device, provision is made to view observations made via a day- or night-vision channel in a shared receiving channel or via an eyepiece unit as day image or night image by designing and arranging a deflector such that the same deflector is used to transfer radiation from the day- or night-vision channel into the shared receiving channel. In particular, it is also provided that further images, such as thermal images, can be transferred to the observer and can be overlaid by the day image or night image, in particular fused.

20 Claims, 4 Drawing Sheets

DAY/NIGHT-VISION DEVICE

CROSS-REFERENCE TO RELATED APPLICATIONS

This application is a 371 of PCT/EP06/06816 filed Jul. 12, 2006, which is a continuation-in-part of U.S. Ser. No. 11/180,587 filed Jul. 14, 2005 now abandoned, which claims priority to European Application 05106494.7 filed Jul. 14, 2005.

The invention relates to a day-night vision device, and in particular a monocular day-night vision device.

BACKGROUND

Day-night vision devices are used in particular for military purposes, where it is important for the devices to be convenient, fast and easy to operate and as compact and light as possible. While it was previously usual to change between day vision device and night vision device according to needs or to replace the standard day vision eyepiece by a "night vision attachment", combined devices are preferably used today. This is advantageous in many respects; for example, carrying of the night vision attachment is superfluous and the change between day and night modes of the device is much faster.

For a device having both day and night vision function, in general a design comprising two separate channels—a day vision channel and a night vision channel—is usual. The day vision channel is generally formed in a known manner as a telescope comprising lens, optically refractive and reflective elements and eyepiece. The night vision channel is generally designed according to substantially the same principle and additionally has an image sensor—such as a light amplifier—and a high-speed lens. In the case of a low-light-level amplifier as an image sensor, the lens focuses the beams emanating from an object to be observed onto the entry window thereof. In the low-light-level amplifier, the image of the object is electronically amplified, therefore appears as a brighter visible image on the exit window and is projected by means of an eyepiece into the observer's eye.

Further functions are often desired for such a day-night vision device. Thus, for example, an image of a camera or location information, for example in the form of a map, can be input into the device via a display and superposed with the respective image in the device—projected by the day or night vision channel to the observer. A disadvantage of known devices is that this additional function has to be provided in duplicate, once for the day vision function in the day vision channel or via the day vision eyepiece and once for the device in its night vision form.

SUMMARY

It is an object of the present invention to provide a day-night vision device which provides the day vision and night vision function with fewer optical components.

A further object of the invention is the provision of a device, in which device additional information, in particular image information, can, with one and the same provision of the additional information, be combined, in particular superposed, with observations which are carried out using the device both in its day vision function and in its night vision function.

The invention relates to a day-night vision device for the observation of objects. The device is formed in such a way that observations, in particular in daylight, can be carried out—directly or indirectly—through a day vision channel and observations, in particular during the night or under poor light conditions, can be carried out—directly or indirectly—through a night vision channel. According to the invention, it is intended to supply the light information received during the respective observations by means of the device to the observer via a common receiving channel and preferably via a common eyepiece, optionally arranged in the receiving channel. In particular, common optical components are used for the supply. A device in which optical components can be used both for the device in the "day vision mode" and in the "night vision mode" is thus provided.

Furthermore, with a device of such a design, it is possible to superpose additional information, for example information fed to a graphic display in the device, such as measuring images, orientation information or target information, on the respective observed image of an object or of an environment during day and night observation. If—as intended according to the invention—both the day image and the night image are received via the same receiving channel, additional information, such as image information, can be input via the same route for the device in its day and night vision function. With the input of additional information via the same route both for day and night function of the device, the same optical and/or electronic components can consequently be used/inserted in both functions for providing the additional information.

A further development of the invention envisages indirectly observing radiation received via the day vision or the night vision channel by deflecting the radiation onto a component arranged in the device and intended for providing additional information, in general a display, and passing said radiation from the component as an additional image to the observer. In such an embodiment of the day-night vision device, radiation received in both channels is available via the common receiving channel to the observer—in particular during observations during the night. For example, a thermal imaging sensor which detects heat radiation and communicates with a recording/display device is arranged in the day vision channel. From said recording/display device, the image is passed into the receiving channel and made available to the user as an indirect day vision image. Light received in the night vision channel likewise enters the receiving channel and is provided as a direct night vision image. It should be pointed out here that the designations day vision image and night vision image, and day vision channel and night vision channel, are not to be understood exclusively as being associated with radiation received during the day or during the night but—for example as described above—observations during the night are also possible via the day vision channel, and vice versa. For the person skilled in the art, the respective function arises out of the relationship, and in particular the figures also serve for providing a better understanding.

For deflecting the respective "radiation information" in the direction of an observation plane, a deflection means is formed and arranged in such a way that it can be used as a deflection means for deflecting radiation received both in the day vision channel and in the night vision channel into the receiving channel and optionally toward an eyepiece unit—i.e. as a common optical component for day and night function of the device. The deflection means may be, for example, a prism having a reflective coat which is opaque, in particular for a specified wavelength range, beams incident on said coat being deflected into the receiving channel. For the use according to the invention in the observation instrument, such a prism is formed in such a way that it can be used firstly as a deflection means for a—direct—observation via/through the day vision channel and secondly as a deflection means for a—direct—observation via/through the night vision channel;

for example, the prism is formed so as to be rotatable. If the prism is arranged between day vision channel and night vision channel, it can be rotated on switching from day to night vision, or vice versa, for example through 180°, about the optical axis of the receiving channel, and switching from the deflection means for observed beams/received beams of the day vision channel to the deflection means for observed beams/received beams of the night vision channel can thus be effected. Optionally, deflection means and eyepiece unit are formed so as to be rotatable, in particular as a jointly rotatable unit.

By rotation of the deflection means through a certain (intermediate) angle of, for example, 90°, the observed beams/received beams of both the day vision channel and the night vision channel are suppressed. This makes it possible for the user to concentrate, for example, only on the display image without being disturbed by day or night images.

It is furthermore advantageous if the deflection means is formed in such a way that additional images, i.e. additional information in the form of images, such as, for example, thermal images or maps, which can be transmitted to the device, for example by a measuring means, such as a camera or a GPS, mechanically connected to the day-night vision device and/or communicating therewith by a cable connection or wireless connection, can be deflected into the receiving channel of said device. It is also possible for—optical—information of internal measuring means/internal sensor elements to be guided and/or deflected via the deflection means into the receiving channel. Thus, the deflection means is, for example, a beam splitter having a coat transparent to a specified (second) wavelength range. It is therefore possible, for example, to arrange a receiver for heat radiation, such as a thermal imaging camera, on the day-night vision device, to play a thermal image of the observed objects or environment as an additional image into the device, for example onto a display in the device, and to guide said image via the beam splitter deflection means into the receiving channel to the observer, the dichroic beam splitter having a coat transparent to the wavelength range of the display. Thus, both observed day vision images and observed night vision images can be exactly superposed with the thermal images and can be viewed as, so to speak, fused images. Of course, pictures in another wavelength range can be fed to the observer in the same manner.

If a graphic or semigraphic display is arranged in the device as a component for providing additional information, the images/data recorded by an internal or external receiver, such as a thermal imaging camera or a GPS, can be input onto the display and projected from there as additional images/information onto the observation plane. The term "image" includes in this context both observations/pictures of objects and/or scenes and measured values, data, maps, graphics or other information which are made available to the observer as imaging—"image".

If corresponding optical components of the device, in particular of the day vision channel or night vision channel of the device, are formed so as to be transparent for the heat spectrum, an internal receiver may be, for example, in the form of a thermal imaging sensor. An image recorded by means of the thermal imaging sensor can be played onto the display or an alternative recording/display device and from there via the deflection means into the receiving channel and to the observer. The latter can then view, for example, a—direct—observed image with superposed thermal image—as an indirect observed image. Such an embodiment provides, for example, an additional indirect observation function.

In an embodiment, the day-night vision device is formed in such a way, or the optical components of the device are formed and arranged in such a way, that day vision imaging, night vision imaging and superposed or fused additional image input into the day or night image have the same imaging scale in the imaging plane/observation plane. This can be realized by matching the optical parameters in the image projection for the various images, for example by introducing corresponding optical components into the device. Furthermore, if the images are to be matched in their imaging properties, for example, the graphic display gives a flat image in contrast to generally curved images from the day and night vision channel. Advantageously, these curvatures are matched or compensated by means of additional curved lenses between the display and the eyepiece. In this embodiment, it is possible for the observer to view two or more fused images, such as, for example, a day image and a thermal image. This may of course be equally true for image transmission to a monitor connected to an output of the device.

In the day-night vision device, an eyepiece unit via which observed images are projected into the user's eye is generally provided. This unit may be composed of a plurality of optical elements, such as convex and concave lenses, as in the case of the first or second lens unit of the day or night vision channel. Moreover—as already mentioned—they may be formed so as to be rotatable—and optionally rotatable together with the deflection means. In an embodiment of the day-night vision device according to the invention, the light emanating from objects is collected in the day vision channel and the night vision channel in each case by means of objective lenses, in general a plurality of said lenses, guided by means of optical components, such as prism elements, plane-parallel plates, etc., to the deflection means and deflected by means of this into the receiving channel or to the eyepiece, where it is available as a day vision or night vision image.

In addition, an image sensor, in particular one which is sensitive to radiation in the visible or infrared range, is coordinated with the night vision channel. If the sensor is a light amplifier and is in the form of a low-light-level amplifier, radiation is projected in a known manner onto the entry window and amplified in the low-light-level amplifier and appears as an amplified green image at the exit window of the amplifier. From there, it is deflected by the deflection means—for direct observation—into the receiving channel. In the case of a light amplifier in the form of an EMCCD sensor or EBCMOS sensor, the light arriving is likewise amplified in a known manner. The sensor (chip) is read out and the information read out is played onto a display. From there, the (night) image is deflected—as described above—by the deflection means—as an indirect observed image—into the receiving channel. The deflection means has a coat transparent in the corresponding wavelength range.

An embodiment of the invention has a thermal imaging sensor as an image sensor. The thermal imaging sensor is arranged in the night vision channel—substantially according to the arrangement of a light amplifier. Thermal images picked up by the sensor are played onto the display. From the display, the images can be fed via the—correspondingly (partly) transparent—deflection means to the observer. This embodiment once again represents an indirect observation variant. In this embodiment, the optical elements of the night vision channel are of course formed so as to be transparent to heat radiation. It is also self-evident that the respective embodiments may require further optical and/or electronic components, which are not shown but whose use is evident to a person skilled in the art in the area to enable the respective embodiments to be realized.

The eyepiece or the eyepiece unit—generally composed of a plurality of lenses—may be arranged in the receiving channel. An arrangement outside the receiving channel and a further optical deflector are also possible. It is also conceivable to use two eyepieces for two-eye observation. However, a monocular formation of a day-night vision device has, for example, the advantage that the eye which is not observing through the device can react faster in the event of a sudden increased light effect, such as a flash. Consequently, and owing to the fact that the room can still be perceived by the non-observing eye in darkness, the device is safer for the user.

Other receiving systems are also conceivable as an eyepiece system for the day-night vision instrument; for example, radiation can be focused onto photosensitive detection elements and observed as a camera image.

In the day-night vision device according to the invention, it is furthermore possible to install components such as reticule plates, for example for sighting, or further measuring means, such as a laser telemeter, for example for measuring the distance to a target, etc. If—as with the integration of a thermal imaging sensor—novel optical materials (e.g. AMTIR) are used in the day-night vision device, the function of the laser telemeter remains substantially undisturbed. Further recording means, such as cameras, can also be integrated into the device for image recording, as can additional illuminators, such as an infrared illuminator. Wireless connections or cable connections can be provided for inputting information (external measuring means) into the device.

BRIEF DESCRIPTION OF THE DRAWINGS

The day-night vision device according to the invention is described in more detail below, purely by way of example, with reference to specific embodiments shown schematically in the drawings, further advantages of the invention also being discussed. Specifically.

DETAILED DESCRIPTION

Figure 1A:
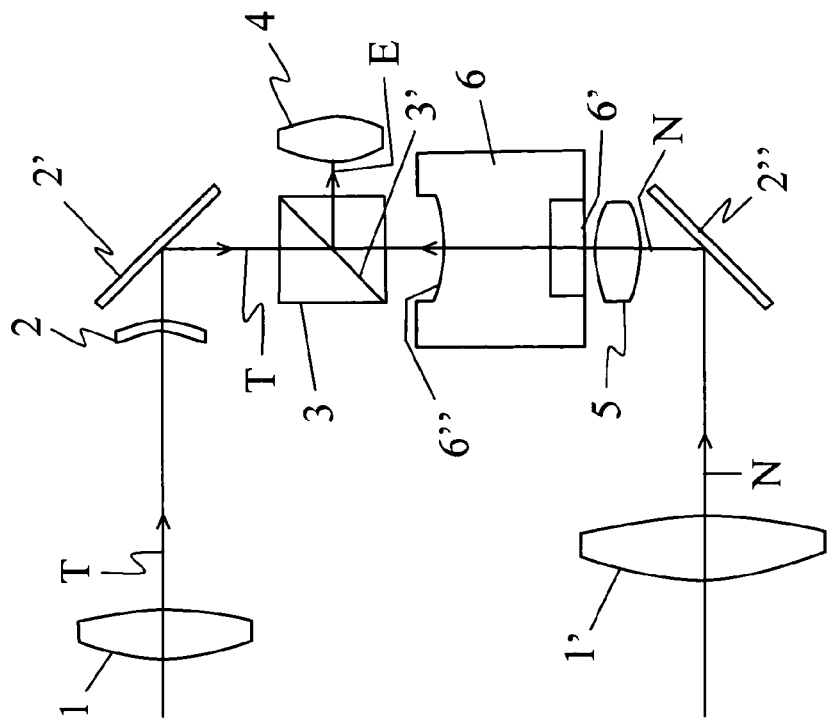
FIG. 1A schematically shows the design of an embodiment of a day-night vision device according to the invention for direct day observation.
Figure 1B:
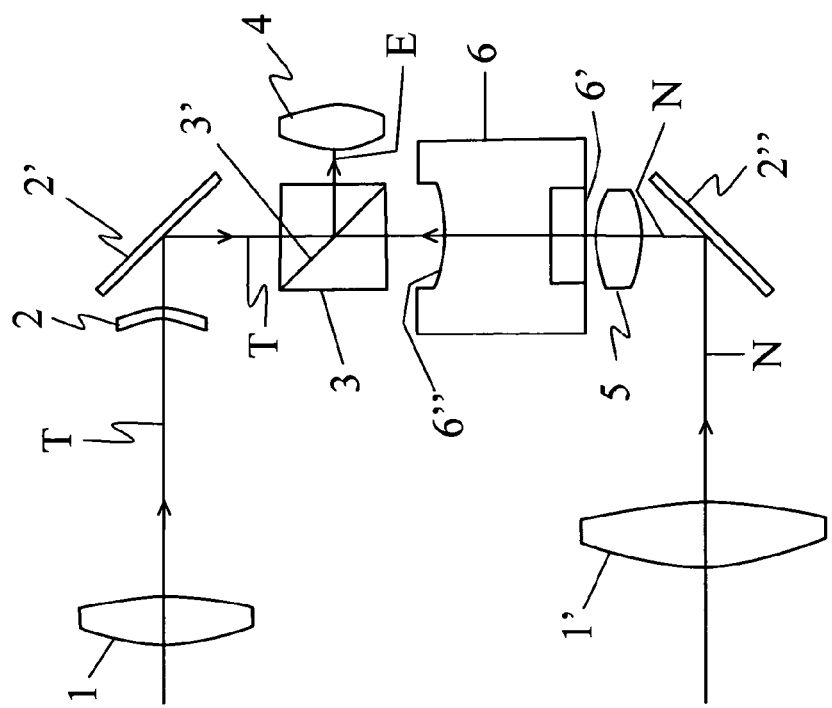
FIG. 1B shows the embodiment from FIG. 1A for direct night observation, FIG. 1C schematically shows the design of an embodiment of a day-night vision device according to the invention, comprising reticule plate and graphic display, FIG. 1D schematically shows the design of an embodiment of a day-night vision device according to the invention, comprising reticule plate, graphic display and laser telemeter, FIG. 1E schematically shows the design of an embodiment of a day-night vision device according to the invention, comprising an EMCCD light amplifier, FIG. 1F schematically shows the design of an embodiment of a day-night vision device according to the invention, comprising a thermal imaging sensor, and FIG. 1G schematically shows the design of an embodiment of a day-night vision device according to the invention, comprising a thermal imaging sensor unit arranged in the day vision channel.
Figure 1C:
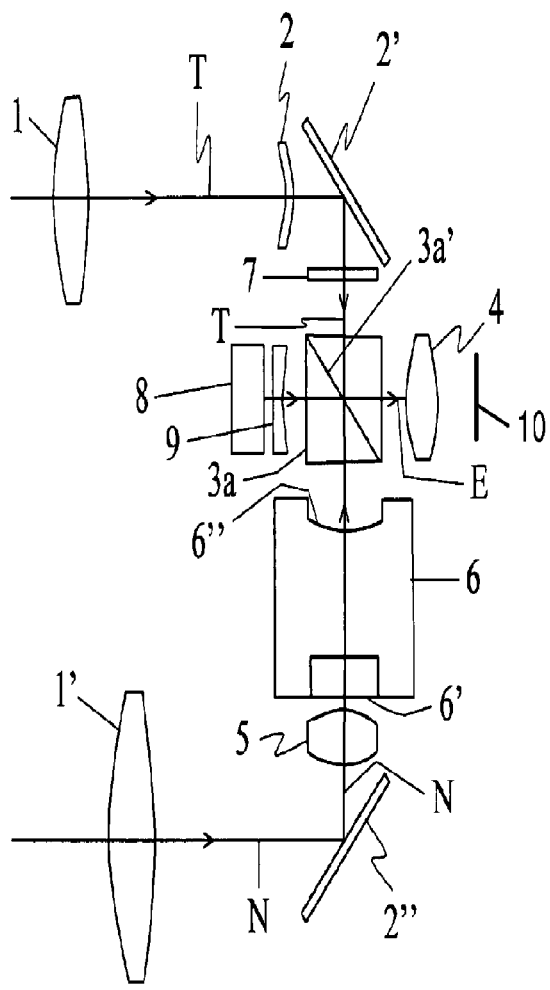
Figure 1D:
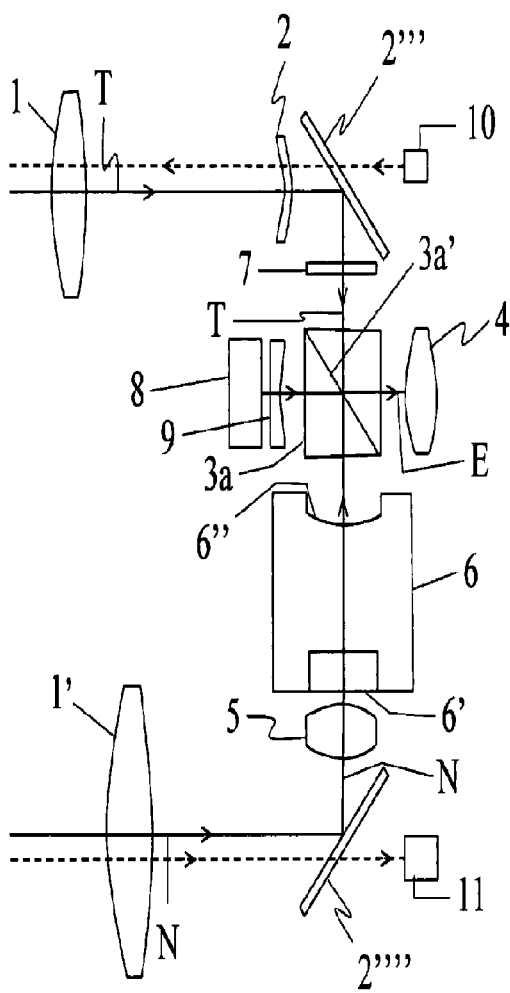
Figure 1E:
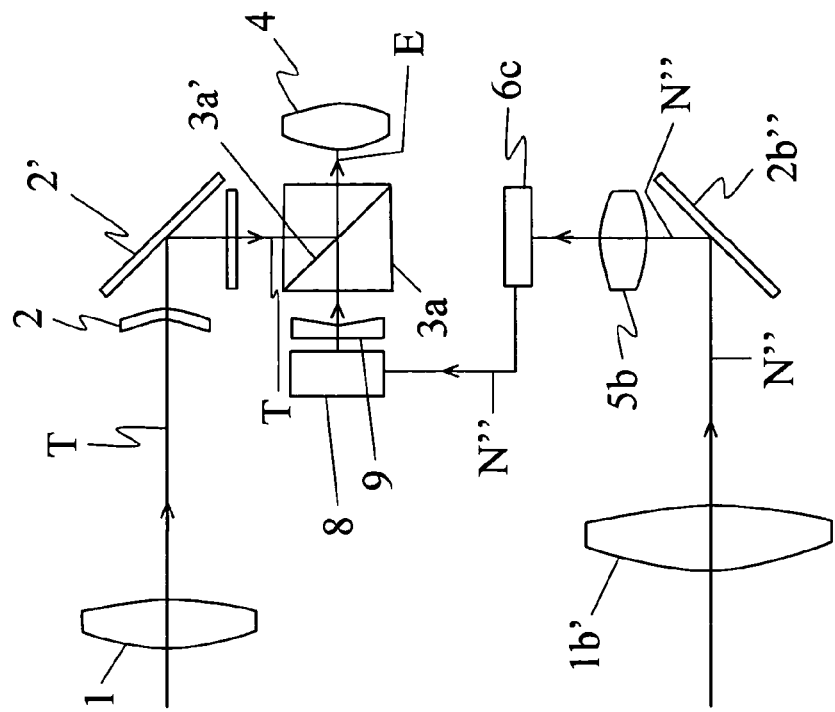
Figure 1F:
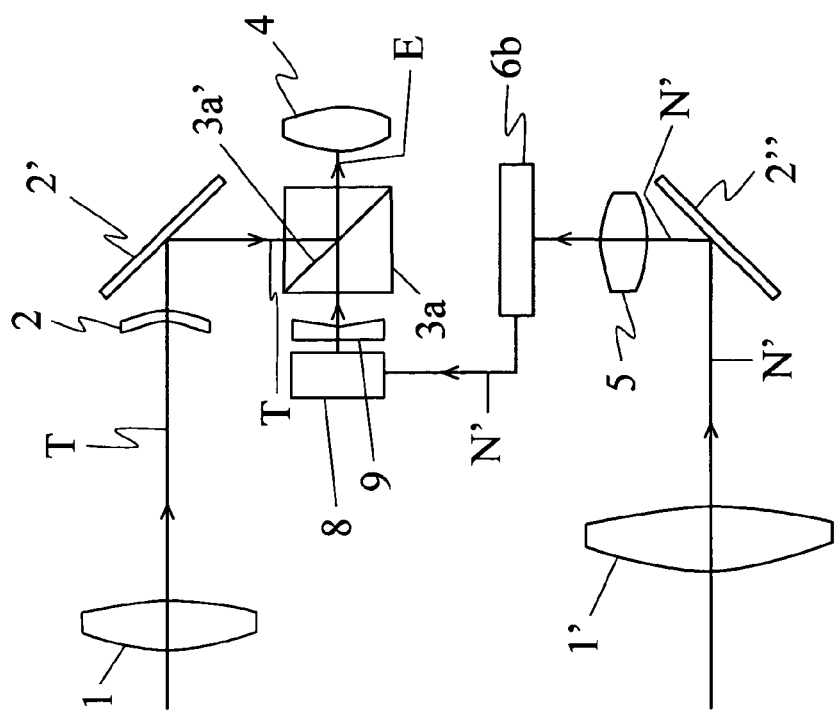

Below, the first and second lens units 1, 1a, 1', 1b' and the eyepiece unit 4 in FIGS. 1A-1G are represented schematically by a lens, but in general will be formed from a lens system. Day or night vision channels T, N of the device are defined in FIGS. 1A-1D as arrangements for transmitting radiation information between the first or second lens unit 1, 1' and the deflection means, which arrangements are established by the respective first and second optical components, respectively. In FIGS. 1E and 1F, the night vision channel N', N" is specified between second lens unit 1', 1b' and graphic display 8. In the figures, the receiving channel E corresponds to the beam path between deflection means and eyepiece unit 4.

The substantial components of a first embodiment of a day-night vision device according to the invention are shown in FIG. 1A. A first lens unit 1 and, as first optical components, a refractive and a reflective optical element are arranged in the day vision channel T. The first lens unit 1 collects beams emanating from objects to be observed and focuses them via the refractive optical element 2 onto the reflective optical element, in this case a first mirror 2'. The first mirror 2' is arranged at an angle—in this case 45°—so that the pencil of rays is reflected toward a prism 3 having a reflective coat 3' as deflection means. In FIG. 1A, the prism 3 is arranged in such a way that the light from the day vision channel T is incident on the reflective coat 3' and is reflected into a receiving channel E. Via an eyepiece unit 4 arranged in the receiving channel E, the light information is made available to an observer as a day vision image. In this diagram, pure—"direct"—day observation is possible. Also shown here (and likewise in the following figures) are beams which do not reach the observer—however, it is clear that these beams are shown purely by way of example and can optionally be blocked off or not collected (for example by a lens cover).

FIG. 1B shows the same schematic design of an embodiment of a day-night vision device according to the invention as in FIG. 1A, but in the arrangement for "direct" night observation. The night vision channel is so to speak "activated" by rotating the deflection prism through 180° about the optical axis of the receiving channel E. The prism is now arranged in such a way that radiation incident via the night vision channel N is deflected by means of the reflective coat 3' into the receiving channel E and further to the eyepiece unit 4 and is available as a (direct) night vision image. Analogously to the procedure in FIG. 1A, radiation emanating from (nocturnal) objects to be observed—often also referred to as low-level light—is collected by means of a second lens unit 1' or a lens system in the night vision channel N and guided to a second mirror 2". At the mirror surface, the light beams are reflected in the direction of an image sensor in the form of a low-light-level amplifier 6. In the figures, a lens 5 is shown in front of the low-light-level amplifier 6, once again schematically for a system for focusing the beams onto an entry window 6' of the low-light-level amplifier 6. In the amplifier, the image or the radiation of the observed object is electronically amplified and appears as an amplified visible image at the exit window 6" of the low-light-level amplifier 6. After amplification, the radiation is incident on the prism 3 and is deflected to the eyepiece system. In this embodiment, the second optical components of the night vision channel N comprise the second mirror 2" and the lens 5.

FIG. 1C in turn schematically shows the design of a device according to the invention, in this case an embodiment having an additional function. Firstly, a reticule plate 7 which is focused onto an observation plane by the transmitted light beams and can be used, for example, for sighting is arranged here in the device. The reticule plate 7 or a plurality of reticule plates can of course be arranged at any suitable point in the device, such as, for example, also on or directly after the exit window 6" of the low-light-level amplifier 6. A graphic display 8 as a component for providing additional information is additionally coordinated with the day-night vision instrument. In the figure, the graphic display 8 with a lens 9 is positioned before the deflection means. By means of the lens 9 (or of a group of lenses), the flat image of the display is adapted with respect to distortion, for the purposes of superposition, to the image by the day or night vision channel T, N (the day vision or night vision image) which—in the embodiment shown—have certain image errors. Thermal images of objects or of the environment which are recorded by, for example, a thermal imaging camera coupled as a further recording means to the device (or integrated in the device) are input onto the graphic display 8 and are projected via the lens 9 (or the group of lenses) and the deflection means as an additional image into an observation plane. The arrangement of the components and of the display in the device is chosen in particular so that the images observed or created in different ways—these are a day image observed via the day vision channel T and a thermal image in FIG. 1C—are of the same size on the observation plane 10, i.e. for example in the observer's eye. Thus, the images can be exactly superposed and are viewed as a fused image. In the embodiment having the additional function, the deflection means formed—here—as prism element 3*a* is of course formed with a coat 3*a'* transparent to a specified wavelength range—in this case that of the display used.

FIG. 1D shows the design of FIG. 1C, comprising a laser telemeter installed as a further measuring means in the day-night vision device and having a laser transmitter 10 and a receiver 11. By means of the telemeter, in this case for distance measurement to targets, laser radiation can be emitted toward the target via the first lens unit 1, collected again via the second lens unit 1' and detected by means of the receiver 11. In this embodiment, the first and second mirrors 2', 2'' from FIGS. 1A-1C are in the form of reflective components 2''', 2'''' transparent to the wavelength range of the laser telemeter.

The arrangement of the telemeter in this embodiment is shown purely by way of example. Furthermore, a distance value can be evaluated by means of the receiver 11 itself, it optionally being possible to play the value onto the graphic display 8 and to project it further to the observer.

FIG. 1E shows an embodiment of a day-night vision device according to the invention, in which embodiment an alternative image sensor—an EMCCD light amplifier 6*b*—is used in the device. Light received in the night vision channel N' is projected to the EMCCD (electron multiplying charge coupled device) and amplified several times there. The information read out of the EMCCD chip is then guided via the graphic display 8 into the receiving channel E and to the eyepiece unit 4. The observation is therefore effected indirectly via the display. In the same manner, an EBCMOS sensor (electron bombarded CMOS) can be used as a light amplifier instead of the EMCCD light amplifier 6*b*.

In this embodiment, (observation) information can be introduced simultaneously via the day and the night vision channel T, N'. For example, integration of further measuring means by input of optical beams into the day vision channel T and further to the eyepiece would thus also be possible, and hence the simultaneous observation of this input information and of the—indirect—night vision image.

The projection of a reticle plate onto the imaging/observation plane is effected in this embodiment by electronically displaying the reticle plate on the graphic display 8.

FIG. 1F shows a further embodiment comprising a further alternative image sensor. Here, the sensor is in the form of thermal imaging sensor 6*c*. In this embodiment, the optical components of the night vision channel N''—such as lens unit 1*b'*, mirror 2*b''* and lens 5*b*—are formed so as to be transparent or reflective for heat radiation, for example for wavelength ranges from 3 μm to 5 μm or from 8 μm to 14 μm. Here, by means of the thermal imaging sensor 6*c*, a thermal image of the observed scene is therefore recorded, played onto the graphic display 8 and fed via the prism element 3*a* to the eyepiece unit 4. Indirect night observation of the scene is permitted for the observer. Furthermore, he can optionally simultaneously also observe via the day vision channel T.

Figure 1G:
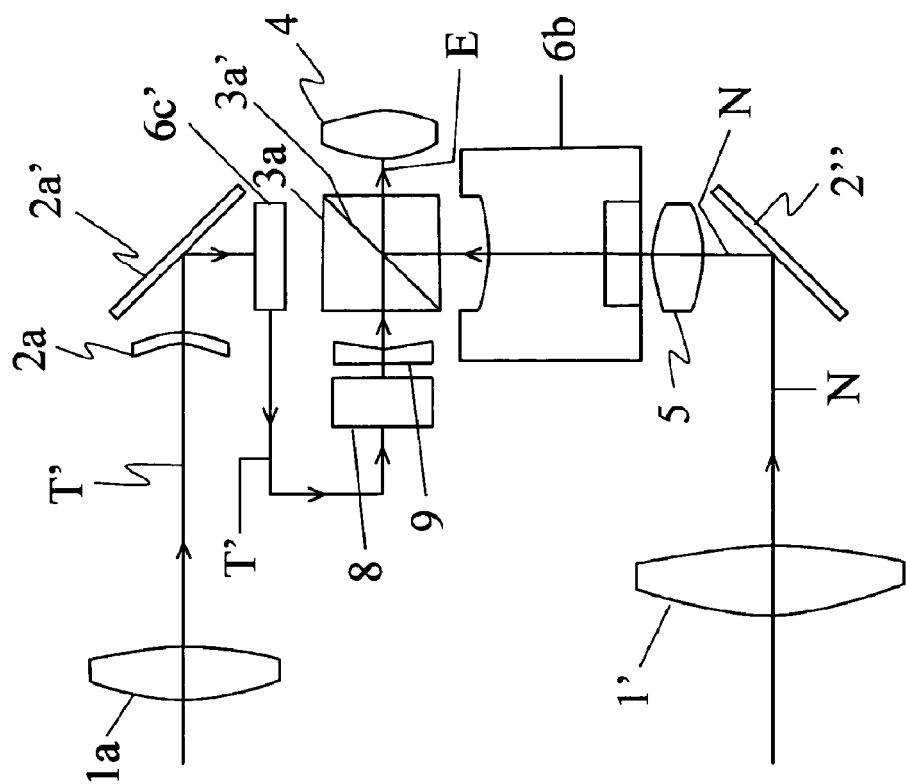

The embodiment in FIG. 1G has a thermal imaging sensor unit 6*c'* as a sensor unit in the day vision channel T' which in this case is specified as an optical beam path between first lens unit 1*a* and graphic display 8. In this embodiment, an image recorded by means of the thermal imaging sensor unit 6*c'* can be perceived by the observer as an "indirect" observation via the graphic display 8. In this embodiment, the optical components of the day vision channel T' are formed so as to be transparent or reflective for the corresponding wavelength range of the heat radiation. Thus, on the one hand, indirect observation can be performed via the thermal imaging sensor unit 6*c'* and the display and, on the other hand, direct observation via the night vision channel with low-light-level amplifier 6*b*. With appropriately designed optical components, image fusion can be achieved. In this embodiment, radiation received in the day vision channel is observed during the night.

Of course, it is just as possible here to use another sensor or a sensor sensitive in a different wavelength range (with optical components formed so as to be correspondingly transparent/reflective), instead of a thermal imaging sensor. This embodiment also offers, for example, the possibility of using a camera as a further recording means instead of the thermal imaging sensor.

The deflection means together with the eyepiece unit can be rotatable about the optical axis of the receiving channel.

We claim:

1. A day-night vision device for observing objects, comprising:
    a day vision channel including:
        a first lens unit; and
        one or more refractive or reflective first optical components;
    a night vision channel including:
        a second lens unit; and
        one or more refractive or reflective second optical components;
    an image sensor;
    an additional channel including a graphic display for providing additional information as an additional image;
    a deflection means; and
    a receiving channel having an eyepiece unit, wherein the deflection means includes a partly transparent beam splitter and is rotatable about an optical axis of the receiving channel so that, by the deflection means:
        radiation information from at least one of the day vision channel, the night vision channel, or the additional channel can be fed into the receiving channel; and
        radiation information from the additional channel can be superposed with radiation information from the night vision channel; or
        radiation information from the additional channel can be superposed with radiation information from the day vision channel;
    an optical connection from the day vision channel to the receiving channel being capable of being switched on and off.

2. The day-night vision device according to claim 1, wherein the deflection means together with the eyepiece unit is rotatable about the optical axis of the receiving channel.

3. The day-night vision device according to claim 1, wherein radiation information only from the additional channel, only from the night vision channel, and only from the day vision channel is deflected selectively into the receiving channel by the deflection means.

4. The day-night vision device according to claim 1, wherein an optical connection from the day and night vision channel to the receiving channel is broken by rotation of the deflection means.

5. The day-night vision device according to claim 1, wherein the deflection means includes a prism.

6. The day-night vision device according to claim 1, wherein the deflection means includes a dichroic beam splitter.

7. The day-night vision device according to claim 1, wherein the image sensor includes:
   a low-light-level amplifier; or
   an electron multiplying charge coupled device (EMCCD) light amplifier; or
   an electron bombarded CMOS (EBCMOS) light amplifier; or
   a thermal imaging sensor.

8. The day-night vision device according claim 1, wherein the first and second lens units, the first and second optical components, the image sensor, the deflection means, and the additional channel for providing additional information are formed and arranged in such a way that day vision image, night vision image, and additional image are of the same size in a common imaging plane.

9. The day-night vision device according to claim 1, wherein:
   the second lens unit, the second optical components, the image sensor, the deflection means, and the additional channel for providing additional information are formed and arranged in such a way that light received in the night vision channel is deflected into the receiving channel and is available as an indirect night vision image.

10. The day-night vision device according to claim 1, wherein:
    the image sensor includes a thermal imaging sensor;
    the second lens unit and the second optical components are formed so as to be transparent for heat radiation; and
    heat radiation is capable of being received as a thermal image by the thermal imaging sensor, the thermal image being capable of being played onto the graphic display and being available as an additional image.

11. The day-night vision device according to claim 1, wherein:
    light received in the day vision channel is deflected into the receiving channel and is available as an indirect day vision image.

12. The day-night vision device according to claim 11, wherein the image sensor includes a thermal imaging sensor unit.

13. The day-night vision device according to claim 1, wherein further recording or measuring means are coordinated with the day-night vision device.

14. The day-night vision device according to claim 13, wherein the further recording or measuring means includes a laser telemeter.

15. The day-night vision device according to claim 1, wherein at least one reticule plate is arranged in at least one of the day or night vision channel.

16. The day-night vision device according to claim 1, wherein the image sensor includes a low-light-level amplifier and the reticule plate is arranged on or immediately after the exit window of the low-light-level amplifier.

17. The day-night vision device according to claim 1, wherein the first optical components include refractive and reflective elements.

18. The day-night vision device according to claim 1, wherein the second optical components include refractive and reflective elements.

19. The day-night vision device according to claim 1, wherein the deflection means includes a partly transparent beam splitter and is rotatable about the optical axis of the receiving channel so that, by the one deflection means:
    radiation information from the day vision channel, the night vision channel, and the additional channel can be fed into the receiving channel.

20. The day-night vision device according to claim 1, wherein radiation information from the additional channel can be superposed with radiation information from the night vision channel; and, radiation information from the additional channel can be superposed with radiation information from the day vision channel.

* * * * *